(12) United States Patent
Sawa et al.

(10) Patent No.: US 12,266,791 B2
(45) Date of Patent: Apr. 1, 2025

(54) HYDROGEN STORAGE ALLOY FOR ALKALINE STORAGE BATTERY

(71) Applicant: JAPAN METALS AND CHEMICALS CO., LTD., Tokyo (JP)

(72) Inventors: Takao Sawa, Yamagata (JP); Saki Notoyama, Yamagata (JP); Tomoki Souma, Yamagata (JP); Katsuyuki Kudo, Yamagata (JP); Takuya Watanabe, Yamagata (JP)

(73) Assignee: JAPAN METALS AND CHEMICALS CO., LTD., Tokyo (JP)

( * ) Notice: Subject to any disclaimer, the term of this patent is extended or adjusted under 35 U.S.C. 154(b) by 143 days.

(21) Appl. No.: 17/790,941

(22) PCT Filed: Feb. 16, 2021

(86) PCT No.: PCT/JP2021/005673
§ 371 (c)(1),
(2) Date: Jul. 5, 2022

(87) PCT Pub. No.: WO2021/205749
PCT Pub. Date: Oct. 14, 2021

(65) Prior Publication Data
US 2023/0076463 A1    Mar. 9, 2023

(30) Foreign Application Priority Data

Apr. 10, 2020 (JP) .................................. 2020-071119
Apr. 13, 2020 (JP) .................................. 2020-071462

(51) Int. Cl.
*H01M 4/38* (2006.01)
*C22C 19/05* (2006.01)
*H01M 4/62* (2006.01)

(52) U.S. Cl.
CPC ............. *H01M 4/383* (2013.01); *C22C 19/05* (2013.01); *C22C 2202/04* (2013.01); *H01M 4/622* (2013.01)

(58) Field of Classification Search
None
See application file for complete search history.

(56) References Cited

U.S. PATENT DOCUMENTS 5,935,732 A    8/1999  Matsumura et al.
6,130,006 A   10/2000  Kohno et al.
(Continued)

FOREIGN PATENT DOCUMENTS

CN    1277464 A   12/2000
CN    1739210 A    2/2006
(Continued)

OTHER PUBLICATIONS

English machine translation of JP 2009-074164, EPO, accessed Oct. 25, 2023.*

(Continued)

*Primary Examiner* — Xiaobei Wang
(74) *Attorney, Agent, or Firm* — Oliff PLC

(57) ABSTRACT

A hydrogen storage alloy suitable for a negative electrode of an alkaline storage battery is provided. The hydrogen storage alloy provided is a hydrogen storage alloy used for an alkaline storage battery that has, as a main phase, one or two crystal structures selected from an $A_2B_7$-type structure and an $AB_3$-type structure, and that is represented by a general formula: $(La_{1-a-b}Ce_aSm_b)_{1-c}Mg_cNi_dAl_eCr_f$ (where suffixes a, b, c, d, e, and f in this formula (1) meet the following conditions:   $0 < a \leq 0.15$;   $0 \leq b \leq 0.15$;   $0.17 \leq c \leq 0.32$; $0.02 \leq e \leq 0.10$; $0 \leq f \leq 0.05$; and $2.95 \leq d+e+f \leq 3.50$.

3 Claims, 2 Drawing Sheets

(56) References Cited

U.S. PATENT DOCUMENTS

| | | |
|---|---|---|
| 6,444,361 B1 | 9/2002 | Komori et al. |
| 2003/0096164 A1 | 5/2003 | Sakai et al. |
| 2007/0158001 A1* | 7/2007 | Kihara .................. C22C 19/03 |
| | | 429/218.2 |
| 2008/0299458 A1 | 12/2008 | Yoshida et al. |
| 2009/0061316 A1 | 3/2009 | Yoshida et al. |
| 2009/0087745 A1 | 4/2009 | Ako et al. |
| 2009/0111023 A1* | 4/2009 | Kihara ................ H01M 10/345 |
| | | 429/218.2 |
| 2009/0155688 A1 | 6/2009 | Endo et al. |
| 2010/0028774 A1 | 2/2010 | Ohyama et al. |
| 2010/0081053 A1 | 4/2010 | Ishida |
| 2010/0323243 A1 | 12/2010 | Yoshida et al. |
| 2011/0229755 A1 | 9/2011 | Sugii et al. |
| 2012/0318413 A1 | 12/2012 | Kakeya et al. |
| 2013/0136983 A1 | 5/2013 | Nakatsuji et al. |
| 2013/0142690 A1 | 6/2013 | Otsuki et al. |
| 2015/0243976 A1* | 8/2015 | Otsuki ................. H01M 4/383 |
| | | 420/455 |
| 2015/0280216 A1 | 10/2015 | Sumiyama et al. |
| 2016/0090643 A1 | 3/2016 | Okuda et al. |
| 2017/0125804 A1 | 5/2017 | Ishida et al. |
| 2018/0114981 A1 | 4/2018 | Ishida et al. |
| 2020/0313179 A1* | 10/2020 | Ishida .................. H01M 4/366 |
| 2021/0218020 A1* | 7/2021 | Wu ..................... H01M 4/383 |

FOREIGN PATENT DOCUMENTS

| | | | |
|---|---|---|---|
| CN | 1974812 A | 6/2007 | |
| CN | 101320802 A | 12/2008 | |
| CN | 101378123 A | 3/2009 | |
| CN | 101501896 A | 8/2009 | |
| CN | 101714626 A | 5/2010 | |
| CN | 102195041 A | 9/2011 | |
| CN | 103053049 A | 4/2013 | |
| CN | 105274395 A | 1/2016 | |
| CN | 106133957 A | 11/2016 | |
| CN | 108172807 A | 6/2018 | |
| CN | 111636012 A * | 9/2020 | ........... C01B 3/0057 |
| JP | H11-323469 A | 11/1999 | |
| JP | 2000-182608 A | 6/2000 | |
| JP | 2005-032573 A | 2/2005 | |
| JP | 2005-290473 A | 10/2005 | |
| JP | 2007-169724 A | 7/2007 | |
| JP | 2008-084668 A | 4/2008 | |
| JP | 2009-074164 A | 4/2009 | |
| JP | 2009-87631 A | 4/2009 | |
| JP | 2009-138220 A | 6/2009 | |
| JP | 2010-212117 A | 9/2010 | |
| JP | 2011-023337 A | 2/2011 | |
| JP | 2011-127185 A | 6/2011 | |
| JP | 2012-211392 A | 11/2012 | |
| JP | 2014-207086 A | 10/2014 | |
| JP | 2016-069692 A | 5/2016 | |
| WO | 95/023435 A1 | 8/1995 | |
| WO | 01/48841 A1 | 7/2001 | |
| WO | 2009/013848 A1 | 1/2009 | |
| WO | 2011/162385 A1 | 12/2011 | |
| WO | 2013/118806 A1 | 8/2013 | |
| WO | 2016/158302 A1 | 10/2016 | |

OTHER PUBLICATIONS

Kiangqian, Shen et al., "The structure and high-temperature (333 K) electrochemical performance of La0.8-CexMg0.2Ni3.5 (x=0.00-0.20) hydrogen storage alloys", International Journal of Hydrogen Energy, (2009), vol. 34, pp. 3395-3403.

Yasuoka, Shigekazu, "Practical Application of Rare Earth-Mg—Ni-Based (Superlattice) Hydrogen Storage Alloy and Development of High-Performance Commercial Nickel-Metal Hydride Battery Using This Alloy", Doctoral Dissertation, Kyoto University, (2017).

Apr. 27, 2021 International Search Report issued in Patent Application No. PCT/JP2021/005673.

Jun. 2, 2020 Search Report issued in International Patent Application No. PCT/JP2020/008332.

Aug. 17, 2022 First Examination Report issued in Indian Patent Application No. 202127043492.

Dec. 1, 2022 Office Action issued in Chinese Patent Application No. 202080023705.9.

U.S. Appl. No. 17/442,927, filed Sep. 24, 2021 in the name of Sawa.

* cited by examiner

HYDROGEN STORAGE ALLOY FOR ALKALINE STORAGE BATTERY

TECHNICAL FIELD

The present invention relates to a hydrogen storage alloy that is used for an alkaline storage battery.

BACKGROUND ART

Nickel-metal hydride secondary batteries that are representative examples of alkaline storage batteries are characterized by having higher capacities than nickel-cadmium batteries and, in an environmental aspect, by not containing harmful substance. As such, they have recently come to be widely used as storage batteries of, for example, mobile phones, personal computers, and electric tools, as well as of hybrid electric vehicles (HEVs) in consumer applications to substitute alkaline primary batteries.

Hydrogen storage alloys with an $AB_5$-type crystal structure have been conventionally used for negative electrodes of alkaline storage batteries. However, as downsizing and weight reduction of batteries achieved by these alloys are limited, development of a new hydrogen storage alloy that can realize a small, high-capacity battery has been anticipated. As solutions, Patent Literature 1 and Patent Literature 2 propose rare earth-Mg-transition metal-based hydrogen storage alloys including Mg.

One example of possible approaches to downsizing and weight reduction is to reduce the amount of a hydrogen storage alloy used for the negative electrode. However, reducing the amount of a hydrogen storage alloy raises a new problem that the output decreases due to a decrease in the number of nickel active sites. To remedy this problem, Patent Literature 3 proposes a technique of raising an operating voltage by using a hydrogen storage alloy having a high hydrogen equilibrium pressure.

Some rare earth-Mg—Ni-based alloys have been proposed as hydrogen storage alloys. For example, Patent Literature 4 discloses, with the aim of providing a long-life secondary battery suitable for increasing the volume energy density, a hydrogen storage alloy having a composition represented by a general formula: $(La_aCe_bPr_cNd_dA_e)_{1-x}Mg_x(Ni_{1-y}T_y)_z$ (where A represents at least one element selected from the group consisting of Pm etc.; T represents at least one element selected from the group consisting of V etc.; a, b, c, d, and e are within ranges defined by $0 \leq a \leq 0.25$, $0 \leq b \leq 0.2$, $0 \leq c$, $0 \leq d$, and $0 \leq e$ and meet a relation expressed by $a+b+c+d+e=1$; and x, y, and z are within ranges respectively defined by $0<x<1$, $0 \leq y \leq 0.5$, and $2.5 \leq z \leq 4.5$).

Patent Literature 5 discloses, as a hydrogen storage alloy that mitigates the rise in internal pressure of a battery during charge after over discharge and contributes to increasing the cycle life of the battery, a hydrogen storage alloy having a composition represented by a general formula: $(La_aPr_bNd_cZ_d)_{1-w}Mg_wNi_{z-x-y}Al_xT_y$ (where symbol Z represents an element selected from the group consisting of Ce etc.; symbol T represents an element selected from the group consisting of V etc.; subscripts a, b, c, and d are within ranges defined by $0 \leq a \leq 0.25$, $0<b$, $0<c$, and $0 \leq d \leq 0.20$ and meet relations expressed by $a+b+c+d=1$ and $0.20 \leq c \leq 0.35$; and subscripts x, y, z, and w are within ranges respectively defined by $0.15 \leq x \leq 0.30$, $0 \leq y \leq 0.5$, $3.3 \leq z \leq 3.8$, and $0.05 \leq w \leq 0.15$).

Patent Literature 6 discloses, as a rare earth-Mg—Ni-based hydrogen storage alloy that is inexpensive and excellent in alkali resistance, a hydrogen storage alloy having a composition represented by a general formula: $(Ce_aPr_bNd_cY_dA_e)_{1-w}Mg_wNi_xAl_yT_z$ (where A represents at least one element selected from the group consisting of Pm, Sm, etc.; T represents at least one element selected from the group consisting of V, Nb, etc.; a, b, c, d, and e meet relations expressed by $a>0$, $b \leq 0$, $C \leq 0$, $d \leq 0$, $e \leq 0$; and $a+b+c+d+e=1$; and w, x, y, and z are within ranges respectively defined by $0.08 \leq w \leq 0.13$, $3.2 \leq x+y+z \leq 4.2$, $0.15 \leq y \leq 0.25$, and $0 \leq z \leq 0.1$).

Further, Patent Literature 7 discloses a hydrogen storage alloy represented by a general formula: $Ln_{1-x}Mg_xNi_yA_z$ (where Ln represents at least one element selected from Ca, Zr, Ti, and rare earth elements including Y; A is at least one element selected from Co, Mn, V, Cr, Nb, Al, Ga, Zn, Sn, Cu, Si, P, and B; and suffixes x, y, and z meet the conditions: $0.05 \leq x \leq 0.25$, $0<z \leq 1.5$, and $2.8 \leq y+z \leq 4.0$). In this hydrogen storage alloy, Ln includes Sm at a ratio of not less than 20 mol %.

Further, Patent Literature 8 discloses, as a hydrogen storage alloy excellent in alkali resistance, a hydrogen storage alloy having a composition represented by a general formula: $(La_aSm_bA_c)_{1-w}Mg_wNi_xAl_yT_z$ (where A and T respectively represent at least one element selected from the group consisting of Pr, Nd, etc. and at least one element selected from the group consisting of V, Nb, etc.; suffixes a, b, and c meet relations respectively expressed by $a>0$, $b>0$, $0.1>c \geq 0$, and $a+b+c=1$; and suffixes w, x, y, and z are within ranges respectively defined by $0.1<w \leq 1$, $0.05 \leq y \leq 0.35$, $0 \leq z \leq 0.5$, and $3.2 \leq x+y+z \leq 3.8$).

Meanwhile, Non Patent Literature 1 reports a hydrogen storage alloy $La_{0.8-x}Ce_xMg_{0.2}Ni_{3.5}$ (x=0 to 0.20) in which La is substituted by Ce. In an evaluation result of this alloy, it is concluded that x=0.1 is the optimal composition in view of the overall electrochemical properties.

In Non Patent Literature 2, a chapter relating to the influence of Ce on an RE-Mg—Ni-based hydrogen storage alloy (RE: rare earth elements) is provided. In this chapter, the following alloys are disclosed and evaluation results thereof are reported:

$(La_{0.5}Nd_{0.5})_{0.85}Mg_{0.15}Ni_{3.3}Al_{0.2}$
$(La_{0.45}Nd_{0.45}Ce_{0.1})_{0.85}Mg_{0.15}Ni_{3.3}Al_{0.2}$
$(La_{0.4}Nd_{0.4}Ce_{0.2})_{0.85}Mg_{0.15}Ni_{3.3}Al_{0.2}$
$(La_{0.3}Nd_{0.3}Ce_{0.4})_{0.85}Mg_{0.15}Ni_{3.3}Al_{0.2}$

CITATION LIST

Patent Literature

Patent Literature 1: Japanese Patent Laid-Open No. 11-323469
Patent Literature 2: International Publication No. WO 01/48841
Patent Literature 3: Japanese Patent Laid-Open No. 2005-32573
Patent Literature 4: Japanese Patent Laid-Open No. 2005-290473
Patent Literature 5: Japanese Patent Laid-Open No. 2007-169724
Patent Literature 6: Japanese Patent Laid-Open No. 2008-84668
Patent Literature 7: Japanese Patent Laid-Open No. 2009-74164
Patent Literature 8: Japanese Patent Laid-Open No. 2009-108379

Non Patent Literature

Non Patent Literature 1: S. Xiangqian et al., Inter. J. Hydrogen Energy, 34, 395 (2009)

Non Patent Literature 2: Shigekazu Yasuoka, a doctoral dissertation: Practical Application of Rare Earth-Mg—Ni-Based (Superlattice) Hydrogen Storage Alloy and Development of High-Performance Commercial Nickel-Metal Hydride Battery Using This Alloy (2017, Kyoto University)

SUMMARY OF INVENTION

Technical Problem

However, in the technologies disclosed in Patent Literature 1 and Patent Literature 2 described above, the alloys are not optimized and fail to be put to practical use for various applications.

The technology disclosed in Patent Literature 3 faces a new problem that using a hydrogen storage alloy having a high hydrogen equilibrium pressure shortens the charge-discharge cycle life.

In the technology disclosed in Patent Literature 4, the content of La that is a relatively inexpensive material is reduced to a low level and consequently Pr, Nd, and further Ti that are expensive are contained in large amounts. Thus, this technology cannot provide a hydrogen storage alloy that is inexpensive and excellent in durability.

Also in the technology disclosed in Patent Literature 5, similarly to Patent Literature 4, Pr and Nd are essential for the alloy while the content of La is low. Thus, this technology cannot provide a hydrogen storage alloy that is inexpensive and excellent in durability.

Further, in the technology disclosed in Patent Literature 6, the alloy does not contain La, and while it contains Ce, the contents of Pr and Nd are relatively high. Thus, this technology cannot provide a hydrogen storage alloy that is inexpensive and excellent in durability.

In the technology disclosed in Patent Literature 7, the alloy contains a relatively large amount of Sm, and thus a less expensive element at least than Pr and Nd is used. Still, this technology cannot provide a hydrogen storage alloy that is inexpensive and excellent in durability.

In the technology disclosed in Patent Literature 8, the alloy contains relatively large amounts of La and Sm, and thus less expensive elements at least than Pr and Nd are mainly used. Still, this technology cannot provide a hydrogen storage alloy that is inexpensive and excellent in durability. In particular, Zr is indispensable for the examples, and only 3.6 is disclosed as the B/A ratio. Moreover, according to this literature, the hydrogen equilibrium pressure that is reduced due to the increased content of La is raised to such a level as to be usable in a battery, but setting a composition rich in inexpensive La often leads to inadequacy.

Non Patent Literature 1 shows a rare earth-Mg—Ni alloy with La partially substituted by Ce. An evaluation of samples of this alloy concludes that an alloy with x=0.1, where x is the amount substituted by Ce, is the optimal composition in view of the overall electrochemical properties. However, this alloy has not yet been put to practical use.

Further, Non Patent Literature 2 concludes that the rare earth-Mg—Ni-based alloy containing Ce was found to deteriorate significantly in a battery due to its small hydrogen absorption and desorption amounts and its tendency to pulverize when repeatedly absorbing and desorbing hydrogen.

Specifically, a rare earth-Mg—Ni-based hydrogen storage alloy cracks as it repeatedly absorbs and desorbs hydrogen, so that pulverization is promoted and new surfaces are formed. When the alloy has low corrosion resistance, the surfaces of the alloy undergo reactions to form rare earth hydroxide, which consumes the electrolyte. As a result, the internal resistance of the battery rises and the discharge capacity decreases, leading to the end of the battery life.

Having been contrived in view of these problems with the existing technologies, the present invention aims to provide a rare earth-Mg—Ni-based alloy as a hydrogen storage alloy for batteries to be put to practical use that is inexpensive and has a good balance among the discharge capacity, the cycle life, and the rate property that are important properties of batteries.

Solution to Problem

To achieve the above object, the present inventors used an alloy of which a main phase had one or two crystal structures selected from an $A_2B_7$-type structure and an $AB_3$-type structure and which has a component composition including inexpensive Ce, as a hydrogen storage alloy for a negative electrode of an alkaline storage battery. This alloy was found to be able to compensate for a hydrogen equilibrium pressure reduced by the use of inexpensive La and to achieve a good balance among the discharge capacity property, the charge-discharge cycle life property, and the rate property, which has led to the development of the present invention.

The present invention provides a hydrogen storage alloy for an alkaline storage battery that is characterized in that a main phase of the hydrogen storage alloy has one or two crystal structures selected from an $A_2B_7$-type structure and an $AB_3$-type structure, and in that the hydrogen storage alloy is specifically of a $Ce_2Ni_7$ type, a $Gd_2Co_7$ type, or a $PuNi_3$ type and has a component composition represented by the following general formula (1):

$$(La_{1-a-b}Ce_aSm_b)_{1-c}Mg_cNi_dAl_eCr_f \quad (1).$$

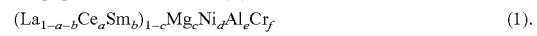

Here, suffixes a, b, c, d, e, and f in this formula (1) meet the following conditions:
0<a≤0.15;
0≤b≤0.15;
0.17≤c≤0.32;
0.02≤e≤0.10;
0≤f≤0.05; and
2.95≤d+e+f≤3.50.

It is preferable that the hydrogen storage alloy according to the present invention have a layer composed of Ni on at least part of particle surfaces, and that this layer composed of Ni be an alkali-treated layer or an acid-treated layer.

Advantageous Effects of Invention

The hydrogen storage alloy for an alkaline storage battery of the present invention is excellent in durability, discharge capacity, and rate property, and a nickel-metal hydride battery using this alloy has a high output density as well as an excellent charge-discharge cycle life. Therefore, this battery is excellent in discharge capacity property and usable for various applications, including consumer applications, industrial applications, and automobile applications.

In addition, forming a layer composed of Ni on a part of particle surfaces by performing surface treatment can mitigate the progress of corrosion of the alloy and further enhance its durability.

DESCRIPTION OF EMBODIMENTS

Figure 1:
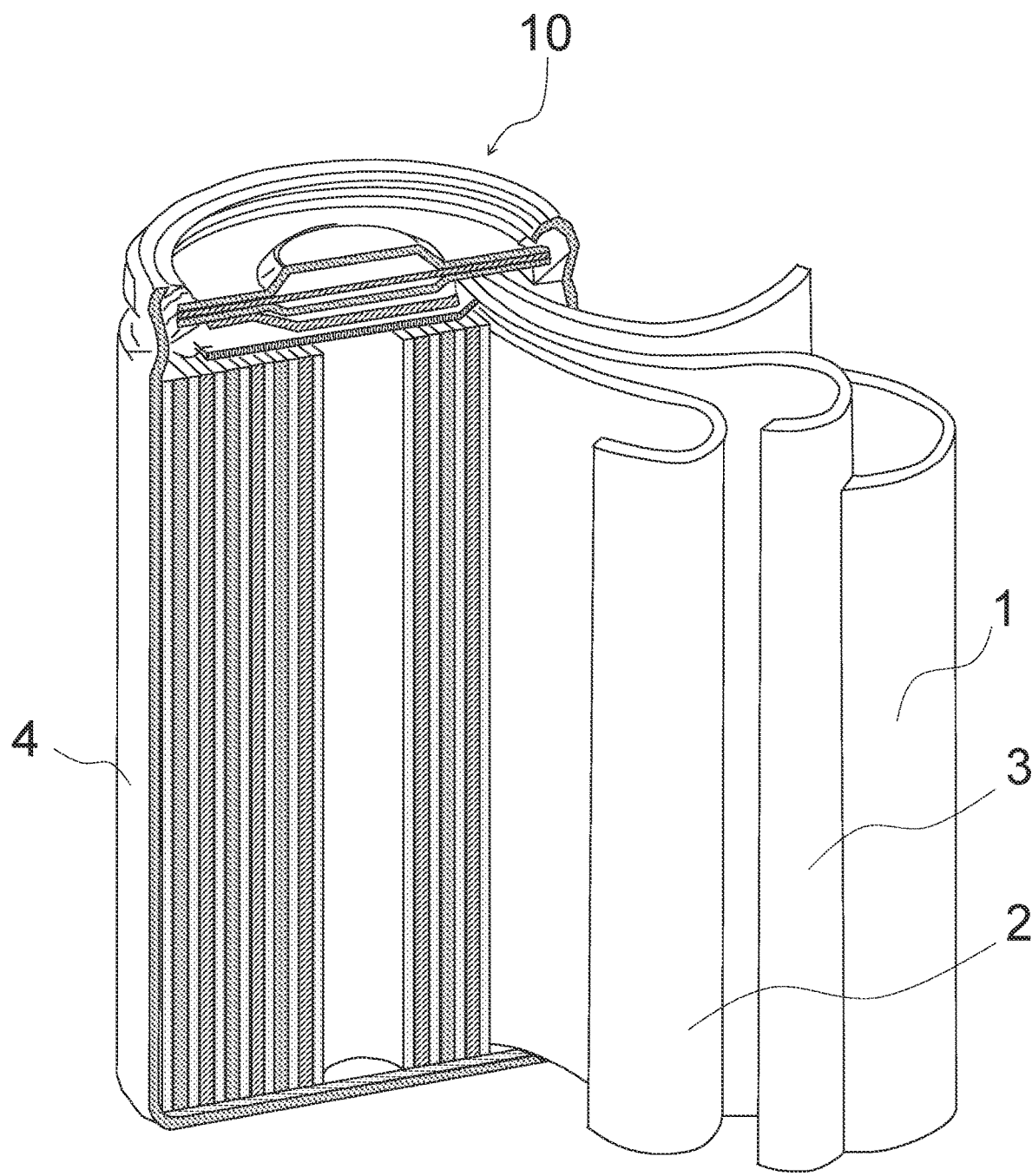
FIG. 1 is a partially cutaway perspective view illustrating an alkaline storage battery that uses a hydrogen storage alloy of the present invention.

An alkaline storage battery that uses a hydrogen storage alloy of the present invention will be described based on FIG. 1 that is a partially cutaway perspective view showing one example of the battery. An alkaline storage battery 10 is a storage battery in which an electrode group including a nickel positive electrode 1 having nickel hydroxide ($Ni(OH)_2$) as a main positive-electrode active material, a hydrogen storage alloy negative electrode 2 having a hydrogen storage alloy (MH) according to the present invention as a negative-electrode active material, and a separator 3 is housed inside a casing 4 along with an electrolyte layer (not shown) filled with an alkaline electrolytic solution.

This battery 10 is classified as a so-called nickel-metal hydride battery (Ni-MH battery), in which the following reactions occur:

Positive electrode: $NiOOH + H_2O + e^- = Ni(OH)_2 + OH^-$ 

Negative electrode: $MH + OH^- = M + H_2O + e^-$ 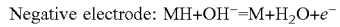

[Hydrogen Storage Alloy]

In the following, a hydrogen storage alloy according to the present invention that is used for a negative electrode of an alkaline storage battery will be described.

The hydrogen storage alloy of the present invention is required to be an alloy of which a main phase has one or two crystal structures selected from an $A_2B_7$-type structure and an $AB_3$-type structure, specifically an alloy of a $Ce_2Ni_7$ type, a $Gd_2Co_7$ type, or a $PuNi_3$ type, and to have a component composition represented by the following general formula (1):

$$(La_{1-a-b}Ce_aSm_b)_{1-c}Mg_cNi_dAl_eCr_f \qquad (1).$$ 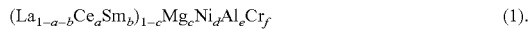

Here, suffixes a, b, c, d, e, and f in this formula (1) meet the following conditions:
0<a≤0.15;
0≤b≤0.15;
0.17≤c≤0.32;
0.02≤e≤0.10;
0≤f≤0.05; and
2.95≤d+e+f<3.50.

When used as a negative electrode of an alkaline storage battery, the alloy represented by this general formula (1) imparts to the battery a high discharge capacity and an excellent cycle life property, and thus contributes to downsizing and weight reduction as well as durability enhancement of the alkaline storage battery.

Reasons for limiting the component composition of the hydrogen storage alloy of the present invention will be described below.

Rare earth elements: $La_{1-a-b}Ce_aSm_b$ (where 0<a≤0.15, 0≤b≤0.15)

The hydrogen storage alloy of the present invention contains rare earth elements as elements of component A of the $A_2B_7$-type structure or the $AB_3$-type structure. As the rare earth elements, in principle, the two elements La and Ce are essential as basic components that provide a hydrogen storage capability. Since La and Ce are different from each other in atomic radius, the ratio between these components can be used to control the hydrogen equilibrium pressure and arbitrarily set the hydrogen equilibrium pressure required for the battery. The value a representing the atomic ratio of Ce among the rare earth elements is required to be within a range of more than zero but not more than 0.15. If the value a exceeds 0.15, cracking due to absorption and desorption of hydrogen is promoted, leading to a reduced cycle life. On the other hand, when the value a is zero, i.e., no Ce is contained, it becomes difficult to adequately control the hydrogen equilibrium pressure and the battery properties are adversely affected. If the value a is within the aforementioned range, a hydrogen equilibrium pressure suitable for the battery is likely to be set. The value a representing the atomic ratio of Ce is preferably within a range of not less than 0.01 and not more than 0.14, and further preferably within a range of not less than 0.02 and not more than 0.12.

Sm can be optionally contained as a rare earth element other than La and Ce. Like La and Ce, Sm is an element occupying a rare earth site as an element of component A of the $A_2B_7$-type structure or the $AB_3$-type structure, and is a component that provides a hydrogen storage capability like these elements. While Sm is less effective in raising the equilibrium pressure than Ce, substituting La by Sm along with Ce improves the durability. The upper limit of the value b representing the atomic ratio of Sm among the rare earth elements is 0.15, and if this is exceeded, the cycle life property degrades due to the balance between the amounts of Sm and Ce. The value b representing the atomic ratio of Sm is preferably not more than 0.14 and further preferably not more than 0.13.

A composition with a large amount of La allows for a high discharge capacity, and when combined with other elements, La can further improve the discharge capacity property. While Pr and Nd that are rare earth elements are not actively used, these may be contained at a level of inevitable impurities.

Mg: $Mg_c$ (where 0.17≤c≤0.32)

Mg is an essential element in the present invention that constitutes an element of component A of the $A_2B_7$-type structure or the $AB_3$-type structure, and contributes to improving the discharge capacity and the cycle life property. The value c representing the atomic ratio of Mg in component A should be within a range of not less than 0.17 and not more than 0.32. If the value c is less than 0.17, the hydrogen desorption performance deteriorates and therefore the discharge capacity decreases. On the other hand, when the value c exceeds 0.32, particularly cracking due to absorption and desorption of hydrogen is promoted and the cycle life property, i.e., the durability degrades. The value c is preferably within a range of not less than 0.18 and not more than 0.30.

Ni: $Ni_d$

Ni is a main element of component B in the $A_2B_7$-type structure or the $AB_3$-type structure. The value d representing the atomic ratio of Ni will be described later.

Al: $Al_e$ (where 0.02≤e≤0.10)

Al is an element contained as an element of component B of the $A_2B_7$-type structure or the $AB_3$-type structure. Al is effective in adjusting the hydrogen equilibrium pressure that is related to the battery voltage, as well as can improve the corrosion resistance and has an effect of improving the durability of a fine-grained hydrogen storage alloy, i.e., has an effect on the cycle life property. To reliably produce this effect, the value e representing the atomic ratio of Al to component A should be within a range of not less than 0.02 and not more than 0.10. If the value e is less than 0.02, the corrosion resistance is not enough, which results in an insufficient cycle life. On the other hand, when the value e exceeds 0.10, the discharge capacity decreases. The value e is preferably within a range of not less than 0.03 and not more than 0.09.

Cr: $Cr_f$ (where $0 \leq f \leq 0.05$)

Like Al, Cr is an element contained as an element of component B of the $A_2B_7$-type structure or the $AB_3$-type structure. Cr is effective in adjusting the hydrogen equilibrium pressure that is related to the battery voltage, as well as can enhance the corrosion resistance and improve the durability in synergy with Al. In particular, Cr has an effect of improving the durability of a fine-grained hydrogen storage alloy, i.e., has an effect on the cycle life property. To reliably produce this effect, the value f representing the atomic ratio of Cr to component A should be not more than 0.05. If the value f exceeds 0.05, the excessive amount of Cr induces cracking due to absorption and desorption of hydrogen, resulting in reduced durability and an insufficient cycle life. The value f is preferably within a range of not less than 0.002 and not more than 0.04, and further preferably within a range of not less than 0.005 and not more than 0.03.

Ratio Between Component A and Component B: $2.95 \leq d+e+f<3.50$

A stoichiometric ratio that is a molar ratio of component B (Ni, Al, and Cr) to component A of the $A_2B_7$-type structure or the $AB_3$-type structure, i.e., the value of d+e+f represented by the general formula is preferably within a range of not less than 2.95 and less than 3.50. When the value is less than 2.95, a subphase, i.e., an $AB_2$ phase increases gradually, so that particularly the discharge capacity decreases and the cycle life also decreases. On the other hand, when the value is not less than 3.50, an $AB_5$ phase increases and cracking due to absorption and desorption of hydrogen is promoted, resulting in a decrease in the durability, i.e., the cycle life. The value is preferably within a range of not less than 3.00 and not more than 3.45.

[Manufacturing Method of Hydrogen Storage Alloy]

Next, a manufacturing method of the hydrogen storage alloy of the present invention will be described.

For the hydrogen storage alloy of the present invention, metal elements such as rare earth elements (Ce, Sm, La, etc.), magnesium (Mg), nickel (Ni), aluminum (Al), and chromium (Cr) are weighed to a predetermined molar ratio. Then, these raw materials are fed into an alumina crucible installed in a high-frequency induction furnace, dissolved in an atmosphere of an inert gas, such as an argon gas, and cast into a mold to produce hydrogen storage alloy ingots. Alternatively, samples in the form of flakes with a thickness of about 200 to 500 μm may be directly produced using a strip casting method.

Since the hydrogen storage alloy of the present invention contains Mg that has a low melting point and a high vapor pressure as a main component, when the raw materials of all the alloy components are dissolved at once, Mg may evaporate and make it difficult to obtain an alloy with the target chemical composition. Therefore, to manufacture the hydrogen storage alloy of the present invention by the dissolving method, it is preferable that, first, the alloy components other than Mg be dissolved, and that then Mg raw materials such as metal Mg and an Mg alloy be fed into the resulting molten metal. Further, it is desirable that this dissolving process be performed in an atmosphere of an inert gas, such as argon or helium. Specifically, it is preferable that this process be performed in a depressurized/pressurized atmosphere in which an inert gas containing not less than 80 vol % of an argon gas is adjusted to 0.05 to 0.2 MPa.

It is preferable that the alloy dissolved under the above conditions be thereafter cast into a water-cooled mold and solidified into hydrogen storage alloy ingots. Then, the melting point ($T_m$) of each of the obtained hydrogen storage alloy ingots is measured using a differential scanning calorimeter (DSC). This is because it is preferable that the hydrogen storage alloy of the present invention be subjected to heat treatment of holding casted ingots in an atmosphere of either an inert gas, such as argon or helium, or a nitrogen gas, or a mixture of the two, at a temperature not lower than 700° C. nor higher than the melting point ($T_m$) of the alloy, for 3 to 50 hours. This heat treatment can raise the ratio of the main phase having one or two crystal structures selected from the $A_2B_7$ type and the $AB_3$ type in the hydrogen storage alloy to not less than 50 vol % and reduce or eliminate an $AB_2$ phase and an $AB_5$ phase that are subphases. That the crystal structure of the main phase of the obtained hydrogen storage alloy is one or two crystal structures selected from the $A_2B_7$ type and the $AB_3$ type can be confirmed by X-ray diffraction measurement using Cu—Kα rays.

If the heat treatment temperature is lower than 700° C., the subphases remain due to insufficient diffusion of the elements, which may lead to a decrease in the discharge capacity of the battery or deterioration of the cycle life property thereof. On the other hand, if the heat treatment temperature is not lower than the alloy's melting point $T_m$ minus 20° C. (not lower than $T_m$−20° C.), crystal grains of the main phase coarsen and the Mg component evaporates, which may result in a decrease in the hydrogen storage amount due to particle size reduction and changes in the chemical composition. Therefore, the heat treatment temperature is preferably within a range of 750° C. to ($T_m$−30° C.). Further, the temperature is preferably within a range of 770° C. to ($T_m$−50° C.).

If the holding time of the heat treatment is not longer than three hours, the ratio of the main phase may fail to be stably raised to not less than 50 vol %. Further, due to insufficient homogenization of the chemical components of the main phase, expansion and contraction during absorption and desorption of hydrogen occur unevenly, so that greater distortion and defect may occur and adversely affect the cycle life property. It is preferable that the holding time of the heat treatment be not shorter than four hours. It is more preferably not shorter than five hours from the viewpoint of homogenization of the main phase and improvement of crystallinity. However, when the holding time exceeds 50 hours, a larger amount of Mg evaporates and causes a change in the chemical composition, which may result in formation of an $AB_5$-type subphase. Further, such a long holding time may add to the manufacturing cost and cause dust explosion of evaporated fine Mg powder, and is therefore not preferable.

The alloy subjected to the heat treatment is pulverized by a dry method or a wet method. In the case of pulverization by the dry method, the alloy can be pulverized using, for example, a hammer mill or an ACM pulverizer to obtain a powder with an average particle size of 20 to 100 μm. On the other hand, in the case of pulverization by the wet method, the alloy is pulverized using a bead mill, an attritor, or the like. Wet pulverization can safely produce fine powder and is therefore preferable particularly when producing fine powder with an average particle size of not more than 20 μm. The particle size may be set to a range appropriate for the application, for example, D50=8 to 100 μm.

Here, as the aforementioned average particle size D50 of the alloy particles, a value measured by a laser diffraction-scattering particle size distribution measuring device is used. As the measuring device, for example, MT3300EXII manufactured by MicrotracBEL Corp. can be used.

The pulverized alloy particles may be thereafter subjected to surface treatment of performing alkali treatment using an alkaline solution, such as KOH or NaOH, or acid treatment using nitric acid, sulfuric acid, or an aqueous hydrochloric acid solution. These surface treatments can be performed to form a layer composed of Ni (an alkali-treated layer or an acid-treated layer) on at least part of surfaces of alloy particles and thereby inhibit the progress of corrosion of the alloy as well as enhance the durability. Thus, the cycle life property of the battery and the discharge property thereof over a wide temperature range can be improved. In particular, in the case of the acid treatment, it is preferable that hydrochloric acid be used as it allows precipitation of Ni with less damage to the alloy's surface. When pulverizing the alloy by the wet method, the surface treatment can also be performed at the same time.

EXAMPLES

In the following, the present invention will be described based on examples.

Example 1

Cells for evaluation in which hydrogen storage alloys No. 1 to 20 having the component compositions shown in Table 1 below were used as the negative-electrode active material were produced by the procedure to be described below, and experiments for evaluating their properties were conducted. Alloys No. 1 to 10 shown in Table 1 are alloy examples that comply with the conditions of the present invention (Inventive Example), and No. 11 to 20 are alloy examples that do not meet the conditions of the present invention (Comparative Examples). Alloy No. 11 of Comparative Example is used as a reference alloy for evaluating cell properties.
(Production of Negative-Electrode Active Material)

The raw materials (Sm, La, Ce, Mg, Ni, Al, and Cr, each with a purity of not lower than 99%) of alloys No. 1 to 20 shown in Table 1 were dissolved using a high-frequency induction heating furnace in an argon atmosphere (Ar: 100 vol %, 0.1 MPa) and cast to produce ingots. Then, these alloy ingots were subjected to heat treatment of holding them in an argon atmosphere (Ar: 90 vol %, 0.1 MPa) at the temperatures of the respective alloys' melting points $T_m$ minus 50° C. (940 to 1130° C.) for ten hours. Thereafter, these alloy ingots were roughly pulverized, and then finely pulverized to 25 μm as a D50 on a mass basis by a hammer mill to obtain samples (negative-electrode active materials) for cell evaluation. After the heat treatment, X-ray diffraction measurement was performed on the pulverized powder, and it was confirmed that the main phase of each of alloys Inventive Examples No. 1 to 10 of the present invention was at least one crystal structure selected from an $A_2B_7$ phase and an $AB_3$ type.
(Production of Cells for Evaluation)
<Negative Electrode>

The negative-electrode active material prepared as described above, Ni powder as a conductive assistant, and two binders (styrene-butadiene rubber (SBR) and carboxymethyl cellulose (CMC)) were mixed to a ratio by weight of negative-electrode active material:Ni powder:SBR:CMC=95.5:3.0:1.0:0.5 and kneaded into a pasty composition. This pasty composition was applied to perforated metal, dried at 80° C., and then roll-pressed under a load of 15 kN to obtain a negative electrode.

<Positive Electrode>

Nickel hydroxide ($Ni(OH)_2$), metallic cobalt (Co) as a conductive assistant, and two binders (styrene-butadiene rubber (SBR) and carboxymethyl cellulose (CMC)) were mixed to a ratio by weight of $Ni(OH)_2$:Co:SBR:CMC=95.5:2.0:2.0:0.5 and kneaded into a pasty composition. This pasty composition was applied to porous nickel, dried at 80° C., and then roll-pressed under a load of 15 kN to obtain a positive electrode.
<Electrolytic Solution>

As the electrolytic solution, an alkaline solution obtained by mixing potassium hydroxide (KOH) into pure water to a concentration of 6 mol/L was used.
<Cells for Evaluation>

The above-described positive electrode and negative electrode were disposed inside an acrylic casing as a counter electrode and a working electrode, respectively, and the above-described electrolytic solution was poured to produce a cell having an Hg/HgO electrode as a reference electrode, which was then used for an evaluation test. Here, the capacity ratio between the working electrode and the counter electrode was adjusted to working electrode:counter electrode=1:3. A non-woven fabric made of polyethylene was installed between the positive electrode and the negative electrode as a separator.
(Evaluation of Cell Properties)

The evaluation test of cells for evaluation based on alloys No. 1 to 20 obtained as described above was performed by the following procedure. In this test, all the cells were evaluated at 25° C.
(1) Discharge Capacity of Electrode The electrode discharge capacity of the working electrode was checked by the following process: Constant-current charge was performed at a current value of 80 mA/g per active material of the working electrode for ten hours, and then constant-current discharge was performed at a current value of 40 mA/g per active material of the working electrode. The discharge was ended on the condition that the potential of the working electrode became −0.5 V. This charge-discharge process was repeated ten times, and the maximum value of the discharge capacity was used as the electrode discharge capacity of the working electrode. It was confirmed that when the cell is charged and discharged ten times, the discharge capacity of the working electrode became saturated and stable.

Using the discharge capacity of alloy No. 11 shown in Table 1 as a reference capacity, the ratio of the measured discharge capacity to this reference capacity was calculated by the following formula (2). When the calculated ratio is more than 1.00, the alloy was evaluated as having a larger discharge capacity than alloy No. 11 and therefore excellent.

Discharge capacity=(discharge capacity of alloy being evaluated)/(discharge capacity of alloy No. 11)   (2)

(2) Cycle Life Property

Using the cells for each of which the electrode discharge capacity of the working electrode was confirmed in (1) Discharge Capacity of Electrode, the cycle life property of each working electrode was determined by the following process:

A current value required to complete charge or discharge of the electrode discharge capacity of the working electrode confirmed in (1) Discharge Capacity of Electrode in one hour was assumed to be 1 C. A process of performing constant-current charge and constant-current discharge at a current value of C/2 with the charge rate of the working electrode within a range of 20 to 80% was counted as one cycle. A hundred cycles of this process were performed and the discharge capacity after the 100 cycles was measured, and then a capacity maintenance rate was determined by the following formula (3):

Capacity maintenance rate=(discharge capacity at the 100th cycle)/(discharge capacity at the first cycle) (3)

To evaluate the cycle life property, the capacity maintenance rate after 100 cycles of alloy No. 11 shown in Table 1 was used as a reference capacity maintenance rate, and a ratio to this reference capacity maintenance rate was calculated by the following formula (4). When the calculated ratio is higher than 1.00, the alloy was evaluated as having a higher cycle life property than alloy No. 11 and therefore excellent.

Cycle life property=(capacity maintenance rate after 100 cycles of alloy being measured)/(capacity maintenance rate after 100 cycles of alloy No. 11) (4)

(3) Rate Property

Using the cells for each of which the electrode discharge capacity of the working electrode was confirmed in (1) Discharge Capacity of Electrode, the rate property of each working electrode was determined by the following procedure:

A current value required to complete charge or discharge of the electrode discharge capacity of the working electrode in (1) Discharge Capacity of Electrode in one hour was assumed to be 1 C. First, constant-current charge was performed at C/5 for 7.5 hours, and then a constant-current discharge was performed at C/5 until the potential of the working electrode became −0.5 V, and the discharge capacity at that time was regarded as a "C/5 discharge capacity." Next, a constant-current charge was performed at C/5 for 7.5 hours, and then a constant-current discharge was performed at 5 C until the potential of the working electrode became −0.5 V, and the discharge capacity at that time was regarded as a "5 C discharge capacity." The capacity maintenance rate upon 5 C discharge was obtained by the following formula (5):

Capacity maintenance rate upon 5 C discharge=(5 C discharge capacity)/(C/5 discharge capacity) (5)

To evaluate the rate property, the capacity maintenance rate upon 5C discharge of alloy No. 11 shown in Table 1 was used as a reference capacity maintenance rate, and a ratio to this reference capacity maintenance rate was calculated by the following formula (6). When the calculated ratio is higher than 1.00, the alloy was evaluated as having a higher rate property than alloy No. 11 and therefore excellent.

Rate property=(capacity maintenance rate upon 5 C discharge of alloy being measured)/(capacity maintenance rate upon 5 C discharge of alloy No. 11) (6)

Figure 2:
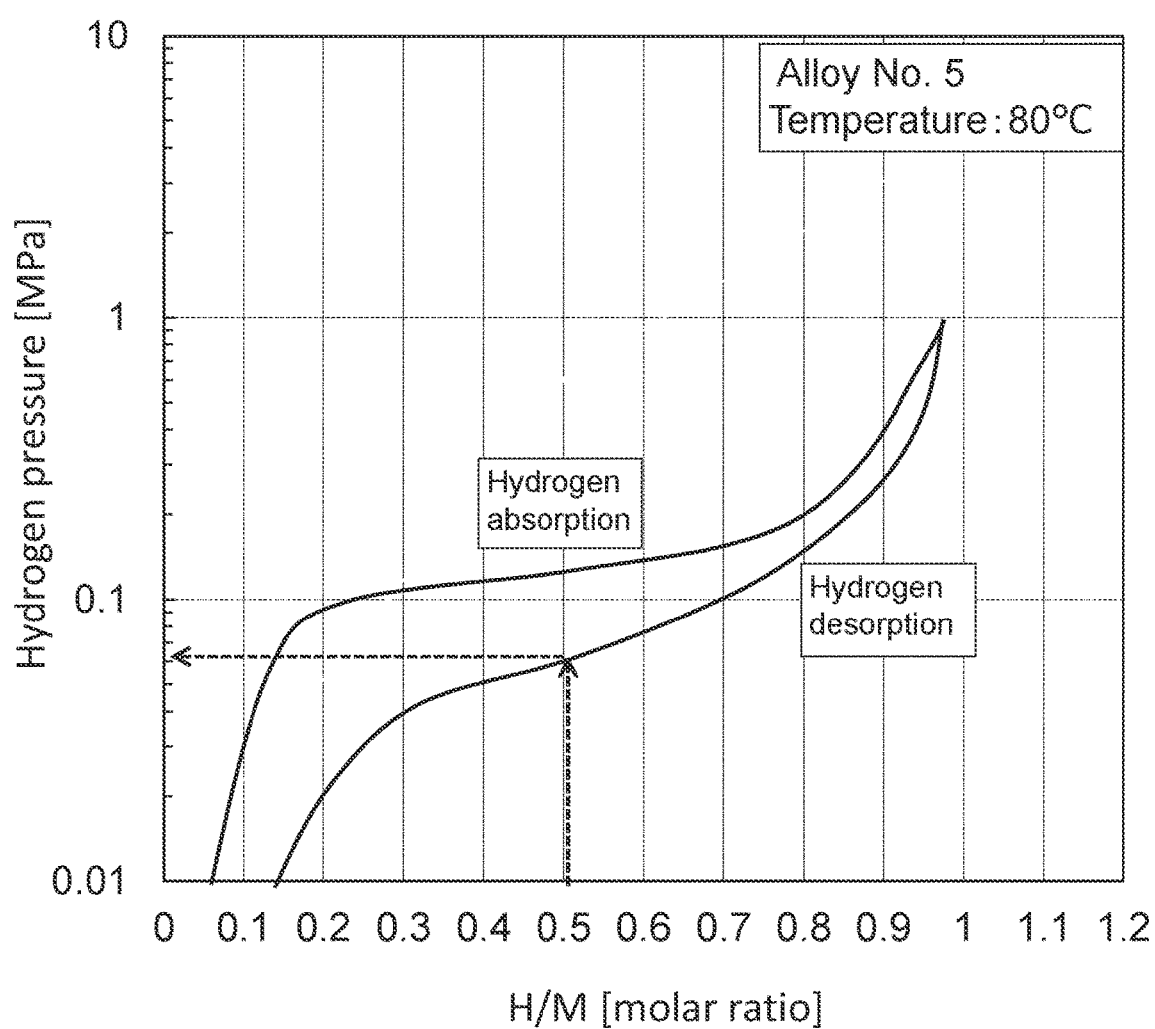
FIG. 2 is a graph showing how to obtain a hydrogen equilibrium pressure using a PCT curve of the hydrogen storage alloy by using alloy No. 5 as an example.

(4) Evaluation of Hydrogen Equilibrium Pressure of Negative-Electrode Active Material The hydrogen absorption and desorption properties of each of the obtained alloys were evaluated using a pressure-composition-temperature (PCT) device. The measurement temperature was 80° C., and a hydrogen pressure was incrementally applied until exceeding 1 MPa and then the pressure was reduced for measurement. The measurement was performed after making the alloy once absorb and desorb hydrogen. The hydrogen equilibrium pressure is a hydrogen pressure when H/M=0.5 (H: hydrogen, M: metal) based on the molar ratio of a hydrogen desorption curve. FIG. 2 shows the PCT curve of alloy No. 5 of the present invention as one example. According to the aforementioned definition, the hydrogen equilibrium pressure of this alloy is 0.066 MPa.

(5) Cost

The costs of the alloys were calculated from the unit price per mass and the ratio by mass of each raw material of the alloys having the component compositions listed in Table 1. Then, these costs were relatively evaluated by being compared with the cost of alloy No. 11 serving as a reference. In the cost evaluation shown in Table 1, ○ means not more than one (less expensive than the reference alloy) to less than 1.05 times; Δ means not less than 1.05 to less than 1.2 times; and x means not less than 1.2 times.

As is clear from Table 1, compared with alloy No. 11, alloys of Inventive Examples No. 1 to 10 have improved evaluation values for the discharge capacity, the cycle life property, and the rate property in a well-balanced manner. It can be seen that, in contrast, each alloy of Comparative Examples No. 12 to 20 has an evaluation value lower than 1.00 for one of the electrode properties. Also in the aspect of cost, the alloys of the present invention are kept down at less than 1.05 times the cost of the reference alloy.

TABLE 1

| Alloy No. | Component composition of hydrogen storage alloy | Discharge capacity (relative to alloy No. 11) | Cycle life property (relative to alloy No. 11) | Rate property (relative to alloy No. 11) | Hydrogen equilibrium pressure (MPa) | Cost (—) | Remarks |
|---|---|---|---|---|---|---|---|
| 1 | $(La_{0.90}Ce_{0.10})_{0.80}Mg_{0.20}Ni_{3.34}Al_{0.06}$ | 1.04 | 1.15 | 1.09 | 0.052 | ○ | Inventive Example |
| 2 | $(La_{0.85}Ce_{0.15})_{0.80}Mg_{0.20}Ni_{3.34}Al_{0.10}$ | 1.04 | 1.08 | 1.20 | 0.069 | ○ | Inventive Example |
| 3 | $(La_{0.98}Ce_{0.02})_{0.80}Mg_{0.20}Ni_{3.31}Al_{0.09}$ | 1.05 | 1.21 | 1.03 | 0.042 | ○ | Inventive Example |
| 4 | $(La_{0.90}Ce_{0.05}Sm_{0.05})_{0.77}Mg_{0.23}Ni_{3.27}Al_{0.03}$ | 1.06 | 1.15 | 1.05 | 0.045 | ○ | Inventive Example |
| 5 | $(La_{0.80}Ce_{0.10}Sm_{0.10})_{0.77}Mg_{0.23}Ni_{3.31}Al_{0.09}$ | 1.07 | 1.11 | 1.17 | 0.066 | ○ | Inventive Example |
| 6 | $(La_{0.75}Ce_{0.12}Sm_{0.13})_{0.77}Mg_{0.23}Ni_{3.27}Al_{0.06}$ | 1.05 | 1.10 | 1.19 | 0.085 | ○ | Inventive Example |
| 7 | $(La_{0.85}Ce_{0.08}Sm_{0.07})_{0.72}Mg_{0.28}Ni_{3.04}Al_{0.06}Cr_{0.01}$ | 1.04 | 1.11 | 1.18 | 0.070 | ○ | Inventive Example |
| 8 | $(La_{0.90}Ce_{0.10})_{0.70}Mg_{0.30}Ni_{2.94}Al_{0.04}Cr_{0.02}$ | 1.04 | 1.12 | 1.09 | 0.052 | ○ | Inventive Example |
| 9 | $(La_{0.95}Ce_{0.05})_{0.83}Mg_{0.17}Ni_{3.35}Al_{0.07}Cr_{0.03}$ | 1.05 | 1.15 | 1.20 | 0.069 | ○ | Inventive Example |
| 10 | $(La_{0.87}Ce_{0.03}Sm_{0.10})_{0.78}Mg_{0.22}Ni_{3.28}Al_{0.08}Cr_{0.01}$ | 1.06 | 1.14 | 1.11 | 0.055 | ○ | Inventive Example |
| 11 | $(La_{0.875}Ce_{0.125})_{0.80}Mg_{0.20}Ni_{3.50}$ | 1.00 | 1.00 | 1.00 | 0.040 | ○ | Comparative Example (Reference) |

TABLE 1-continued

| Alloy No. | Component composition of hydrogen storage alloy | Discharge capacity (relative to alloy No. 11) | Cycle life property (relative to alloy No. 11) | Rate property (relative to alloy No. 11) | Hydrogen equilibrium pressure (MPa) | Cost (—) | Remarks |
|---|---|---|---|---|---|---|---|
| 12 | $La_{0.67}Mg_{0.33}Ni_{2.90}$ | 0.93 | 1.04 | 0.96 | 0.035 | ○ | Comparative Example |
| 13 | $(La_{0.70}Ce_{0.30})_{0.80}Mg_{0.20}Ni_{3.34}Al_{0.06}$ | 1.05 | 0.81 | 1.28 | 0.179 | ○ | Comparative Example |
| 14 | $(La_{0.90}Sm_{0.10})_{0.80}Mg_{0.20}Ni_{3.50}Al_{0.10}$ | 0.99 | 1.04 | 0.93 | 0.032 | ○ | Comparative Example |
| 15 | $(La_{0.80}Ce_{0.20})_{0.75}Mg_{0.25}Ni_{3.27}Al_{0.17}$ | 1.07 | 0.88 | 1.14 | 0.096 | ○ | Comparative Example |
| 16 | $(La_{0.70}Ce_{0.30})_{0.88}Mg_{0.12}Ni_{3.50}Al_{0.15}$ | 1.08 | 0.84 | 1.26 | 0.168 | ○ | Comparative Example |
| 17 | $(La_{0.45}Nd_{0.45}Ce_{0.10})_{0.85}Mg_{0.15}Ni_{3.30}Al_{0.20}$ | 0.97 | 1.11 | 1.20 | 0.120 | x | Comparative Example |
| 18 | $(La_{0.80}Ce_{0.20})_{0.75}Mg_{0.25}Ni_{3.27}Al_{0.11}Cr_{0.06}$ | 0.98 | 0.92 | 1.16 | 0.092 | ○ | Comparative Example |
| 19 | $(La_{0.60}Sm_{0.40})_{0.75}Mg_{0.25}Ni_{3.21}Al_{0.14}$ | 0.95 | 0.90 | 1.19 | 0.116 | Δ | Comparative Example |
| 20 | $(La_{0.60}Sm_{0.40})_{0.84}Mg_{0.16}Ni_{3.18}Al_{0.17}$ | 0.97 | 0.96 | 0.90 | 0.024 | Δ | Comparative Example |

Example 2

(Production of Negative-Electrode Active Material)

A hydrogen storage alloy (samples No. B1 and B2) having a component composition of $(La_{0.90}Ce_{0.05}Sm_{0.05})_{0.78}Mg_{0.22}Ni_{3.39}Al_{0.08}Cr_{0.01}$ was dissolved using a high-frequency induction heating furnace, which had been vacuumed once, in an argon atmosphere (Ar: 100 vol %, 0.1 MPa) and cast to obtain an ingot. Then, this ingot was subjected to heat treatment of holding it in an argon atmosphere (Ar: 90 vol %, 0.1 MPa) at 1000° C. (the alloy's melting point $T_m$ minus 50° C.) for ten hours. Thereafter, the ingot was roughly pulverized, and then finely pulverized to D50 on a mass basis=25 μm using a hammer mill.

Then, surface treatment by the following two standards was performed on these finely pulverized alloy powders to obtain samples (negative-electrode active materials) for cell evaluation.

- Alkali treatment: immersing the alloy in a 60° C. aqueous sodium hydroxide containing 40 mass % of NaOH, under the condition of a solid to liquid ratio of 1:2, for two hours (sample No. B1)
- Acid treatment: immersing the alloy in a 30° C. aqueous hydrochloric acid solution with a concentration of 1 mol/L, under the condition of a solid to liquid ratio of 1:1, for two hours (sample No. B2).

(Production of Evaluation Cells and Evaluation of Cell Properties)

Next, using the samples for cell evaluation prepared as described above, evaluation cells were produced in the same manner as in Example 1, and the cell properties (the discharge capacity, the cycle life property, and the rate property) were evaluated in the same manner as in Example 1. The results were relatively evaluated using, as a reference value (1.00), the measured value of alloy No. 11 (not surface-treated) that is used as a reference in Example 1. The result is shown in Table 2.

TABLE 2

| Sample No. | Discharge capacity (relative to alloy No. 11) | Cycle life property (relative to alloy No. 11) | Rate property (relative to alloy No. 11) | Remarks |
|---|---|---|---|---|
| B1 | 1.05 | 1.20 | 1.15 | Inventive Example |
| B2 | 1.04 | 1.21 | 1.17 | Inventive Example |
| 11 | 1.00 | 1.00 | 1.00 | Comparative Example (Reference) |

As can be seen from Table 2, the hydrogen storage alloys of the present invention were significantly improved in cycle life property and rate property as a result of surface treatment.

INDUSTRIAL APPLICABILITY

The hydrogen storage alloy of the present invention is superior to conventionally used $AB_5$-type hydrogen storage alloys in all of discharge capacity, cycle life property, and rate property. Therefore, this hydrogen storage alloy is suitable as an alloy for negative electrodes of a wide range of alkaline storage batteries, from those for consumer applications as substitutes for alkaline primary batteries to those for various industrial applications and on-board applications.

REFERENCE SIGNS LIST

1: Positive electrode
2: Negative electrode
3: Separator
4: Casing (battery case)
10: Alkaline storage battery

The invention claimed is:

1. A hydrogen storage alloy used for an alkaline storage battery, wherein
    a main phase of the hydrogen storage alloy has one or two crystal structures selected from an A2B7-type structure and an AB3-type structure, and in that the hydrogen storage alloy is represented by the following general formula (1) and containing inevitable impurities:

$$(La_{1-a-b}Ce_aSm_b)_{1-c}Mg_cNi_dAl_eCr_f \quad (1),$$

wherein suffixes a, b, c, d, e, and f in this formula (1) meet the following conditions:
    $0.01 \leq a \leq 0.15$;
    $0 \leq b \leq 0.15$;
    $0.17 \leq c \leq 0.32$;

$0.02 \leq e \leq 0.10$;
$0 \leq f \leq 0.05$; and
$3.00 \leq d+e+f < 3.50$,
wherein the hydrogen storage alloy has a hydrogen equilibrium pressure in the range of 0.042 MPa to 0.085 MPa.

2. The hydrogen storage alloy for an alkaline storage battery according to claim 1, wherein a plurality of particles of the hydrogen storage alloy has a layer composed of Ni on at least part of one or more particle surfaces.

3. The hydrogen storage alloy for an alkaline storage battery according to claim 2, wherein the layer composed of Ni is an alkali-treated layer or an acid-treated layer.

* * * * *